(12) United States Patent
Hoefler et al.

(10) Patent No.: US 7,815,403 B2
(45) Date of Patent: Oct. 19, 2010

(54) MATERIAL REMOVAL TOOL STIFFENED WITH SPACERS ARRANGED ALONG A LENGTH

(75) Inventors: Brian Hoefler, Macomb, MI (US); Don Azzopardi, Walled Lake, MI (US)

(73) Assignee: Valenite LLC, Madison Heights, MI (US)

( * ) Notice: Subject to any disclaimer, the term of this patent is extended or adjusted under 35 U.S.C. 154(b) by 868 days.

(21) Appl. No.: 11/730,690

(22) Filed: Apr. 3, 2007

(65) Prior Publication Data
US 2008/0226401 A1    Sep. 18, 2008

Related U.S. Application Data

(60) Provisional application No. 60/906,814, filed on Mar. 14, 2007.

(51) Int. Cl.
*B23C 5/00* (2006.01)
*B23C 9/00* (2006.01)

(52) U.S. Cl. .................. 409/131; 409/234; 409/141; 408/238; 408/143; 29/446

(58) Field of Classification Search .............. 409/234, 409/141, 232, 131–132; 408/143, 238, 239 R, 408/1 R; 83/664; 407/31, 32, 33–34; 144/218, 144/231–233, 237; 188/378; 29/446, 428
See application file for complete search history.

(56) References Cited

U.S. PATENT DOCUMENTS

| | | | | |
|---|---|---|---|---|
| 2,431,581 A | * | 11/1947 | Owen et al. | 407/34 |
| 2,843,921 A | * | 7/1958 | Ang | 75/248 |
| 3,207,009 A | * | 9/1965 | Carlstedt | 408/143 |
| 3,938,626 A | * | 2/1976 | Hopkins | 188/378 |
| 4,011,026 A | * | 3/1977 | Bennett | 408/199 |
| 4,037,282 A | | 7/1977 | Dahl | |

(Continued)

FOREIGN PATENT DOCUMENTS

JP        55-112717 A  *  8/1980

(Continued)

OTHER PUBLICATIONS

Printout from www.itia.info, article titled "Cemented Carbides", printed May 25, 2010.*

(Continued)

*Primary Examiner*—Erica E Cadugan
(74) *Attorney, Agent, or Firm*—Drinker Biddle & Reath LLP

(57) ABSTRACT

An exemplary embodiment of a material removal tool has a housing at a mating end, an extension longitudinally extending from the housing to a distal end, a plurality of spacers arranged along the extension, and a nut at the distal end of the extension, wherein the plurality of spacers are formed from a material having a Young's modulus of greater than about 1.5 times that of steel. The spacers along the extension of the tool place the stiffer material of the spacer at a location of greatest resistance to bending moments (i.e. highest sectional modulus). Optionally preloading and "built-in" relief points contribute to improved performance of the material removal tool. A method of manufacturing a material removal tool and a method of machining a workpiece are also disclosed.

39 Claims, 7 Drawing Sheets

U.S. PATENT DOCUMENTS

| | | | |
|---|---|---|---|
| 4,885,964 A * | 12/1989 | Nielsen et al. | 83/56 |
| 5,316,061 A * | 5/1994 | Lee | 144/218 |
| 5,996,659 A * | 12/1999 | Burgess | 144/347 |
| 6,517,427 B1 | 2/2003 | Yoshikawa et al. | |
| 7,131,473 B1 | 11/2006 | Brewer | |
| 2002/0106251 A1 | 8/2002 | Ripley | |
| 2005/0214087 A1 * | 9/2005 | Agapiou et al. | 409/141 |
| 2007/0245535 A1 | 10/2007 | Noggle | |

FOREIGN PATENT DOCUMENTS

| | | |
|---|---|---|
| JP | 2005-329509 A * | 12/2005 |
| RU | 2109599 C1 * | 4/1998 |
| SU | 1349887 A1 * | 11/1987 |

OTHER PUBLICATIONS

Printout from www.matweb.com re the properties of alumina (Al2O3), printed Jun. 2010.*

Printout from www.matweb.com re the property search for materials with a modulus of elasticity within a particular range, printed Jun. 2010.*

Machine translation of JP-2005-329509, which JP '509 was published in Dec. 2005.*

* cited by examiner

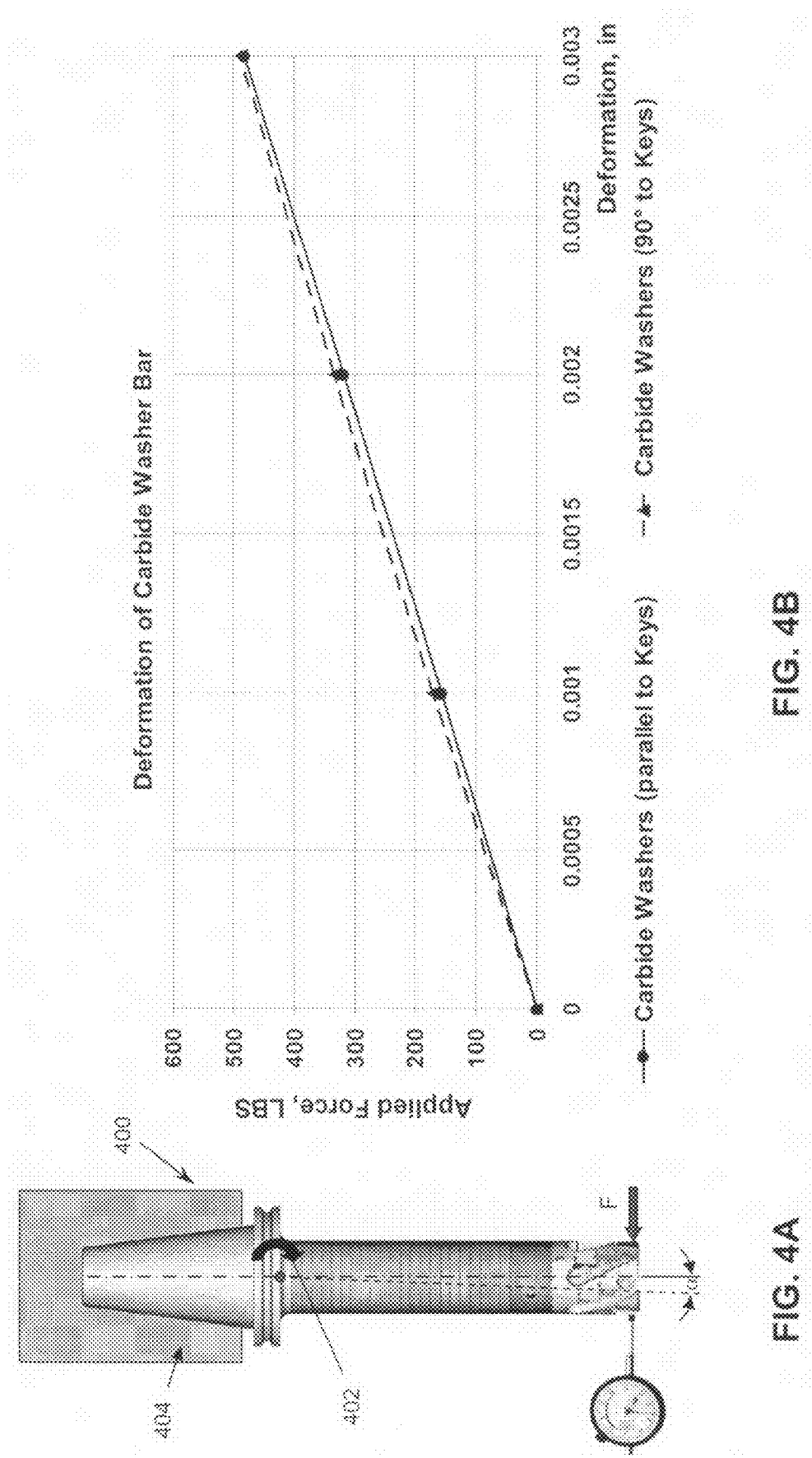

MATERIAL REMOVAL TOOL STIFFENED WITH SPACERS ARRANGED ALONG A LENGTH

CROSS-REFERENCE TO RELATED APPLICATIONS

This application claims priority under 35 U.S.C. §119(e) to U.S. Provisional Application Ser. No. 60/906,814, filed on Mar. 14, 2007, entitled "MATERIAL REMOVAL TOOL STIFFENED WITH SPACERS ARRANGED ALONG A LENGTH," the entire contents of which are incorporated herein by reference.

FIELD

The present disclosure relates to a material removal tool and a method of machining. Specifically, the present disclosure relates to a material removal tool incorporating one or more spacers, such as a washer, a disc or other type of spacer, arranged along a length of the tool. The spacer can be formed from stiff materials, for example, cemented carbide (WC), heavy metal (a steel-WC composite) or binderless carbide, and contributes to improved machining of workpieces.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Machining of workpieces of high strength materials and, particularly, large forged structural components formed of high strength materials, generally requires many hours to complete the machining to finished specifications. As a result of the large size of the finished components, long-reach material removal tools mounted in machine tools are used to perform the machining.

However, workpieces of high strength materials, such as, e.g., titanium, are difficult to machine, partially due to the "push back" force on the tools that is characteristic of machining many high strength materials. The combination of "push back" force and a long-reach (flexible) tool requires extra machine compensation to ensure that the material is adequately removed. In practice, up to 30% of the total time spent machining these workpieces is spent on spring-back passes, i.e., multiple passes over the same area of the workpiece being machined to clean up material left behind due to tool deflection and to reach final specifications.

It is well known that cemented carbide materials have a Young's modulus around twice that of steel. Attempts have been made to apply tools with cemented carbide shanks in the machining of workpieces of high strength materials. For example, FIG. 1 illustrates a material removal tool 10 with a unitary cemented carbide shank 12. The cemented carbide shank 12 extends from the mating end 14 of the material removal tool 10 toward the cutting end 16 of the material removal tool 10 and is formed of one piece. The cemented carbide shank 12 can have an internally arranged piece of steel, such as the steel rod 18 shown in FIG. 1. At the mating end 14 is a suitable mating surface 20 that mates with the base of the operating machine tool (not shown). At the cutting end 16 is a coupling 22 that at a first end 24 connects to the cemented carbide shank 12 and that at a second end 26 has a connector 28. Typically, a cap with mounted cutting inserts (not shown) is affixed to the connector 28.

The typical prior art material removal tool exhibits catastrophic breakage of the cemented carbide shank. Without being held to one theory of failure, it is believed that bending, e.g., deflection of the distal end, of the tools with unitary-shanks places a compressive load on one side of the shank and a tensile load on the other side of the shank. However, cemented carbide is generally fine grained (approximately 1 µm to 2 µm) and the crack mean free path is low, characteristics which generally facilitate crack propagation and failure. Thus, when under tensile forces the unitary-cemented carbide shank fails easily.

One non-limiting example of machining with long reach material removal tools where push back is observed is machining of large, single-piece, forged structural components formed from high strength materials, predominantly high strength materials like titanium. These structural components are used in the aerospace industry, such as for commercial aircraft, and are very expensive. For example, these structural components can be >$200,000 before any machining is performed, and generally, many hours are required to complete the machining to finished specifications. There is a large savings potential (machine time & tool expense) by minimizing tool deflections and the need for "spring back" passes.

SUMMARY

Exemplary embodiments of a material removal tool uses a series of spacers stacked along the extension of the tool. The spacers are formed of a material that has a Young's modulus (E) that is greater than steel, i.e., greater than $30 \times 10^6$ pounds force per square inch ($lbf/in^2$) The same spacers can be used on various size, e.g., length and/or diameter, of tools with varying lengths of tools using more or less spacers in quantity. Standardizing the spacers combined with manufacturing in larger quantities allows for good economies. From a technical point, spacers place the stiffer material of the spacer at a location of greatest resistance to bending moments (i.e. highest sectional modulus). By optionally preloading, first with a preload nut, and optionally & additionally with a cap, one can take further advantage of the compressive strength of the spacer material. Also, there are "built-in" relief points on the tensile half of the tool under bending moments when the spacers separate, slide or otherwise move relative to each other. In one exemplary embodiment, it is possible to preload the system sufficiently that no tensile resultant loads would be experienced when the tool is used. Finally, common parts, such as a spacer and a preload nut, minimizes parts (manufacturing cost low).

An exemplary embodiment of a material removal tool comprises a housing at a mating end, an extension longitudinally extending from the housing to a distal end, a plurality of spacers arranged along the extension, and a nut at the distal end of the extension, wherein the plurality of spacers are formed from a material having a Young's modulus of greater than about 1.5 times that of steel.

An exemplary embodiment of a method of manufacturing a material removal tool comprises arranging a plurality of spacers along at least a portion of an extension, the extension longitudinally extending from a housing of the material removal tool to a distal end, fastening a nut at a distal end of the extension, and preloading the plurality of spacers into compression, wherein the plurality of spacers are formed from a material having a Young's modulus of greater than about 1.5 times that of steel.

An exemplary embodiment of a method of machining a workpiece comprises removing material from the workpiece with a material removal tool, wherein the material removal tool includes a housing at a mating end, an extension longitudinally extending from the housing to a distal end, a plurality of spacers arranged along the extension, and a nut at the distal end of the extension, and wherein the plurality of spacers are formed from a material having a Young's modulus of greater than about 1.5 times that of steel.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which:

FIGS. 4A and 4B relate to deformation observed when using a material removal tool with spacers. FIG. 4A shows a schematic representation of a material removal tool with cemented carbide spacers. FIG. 4B is a graph of applied force as a function of deformation in two directions for material removal tool shown in FIG. 4A FIGS. 5A and 5B relate to deformation observed when using a material removal tool formed of solid steel.

DETAILED DESCRIPTION

Figure 2:
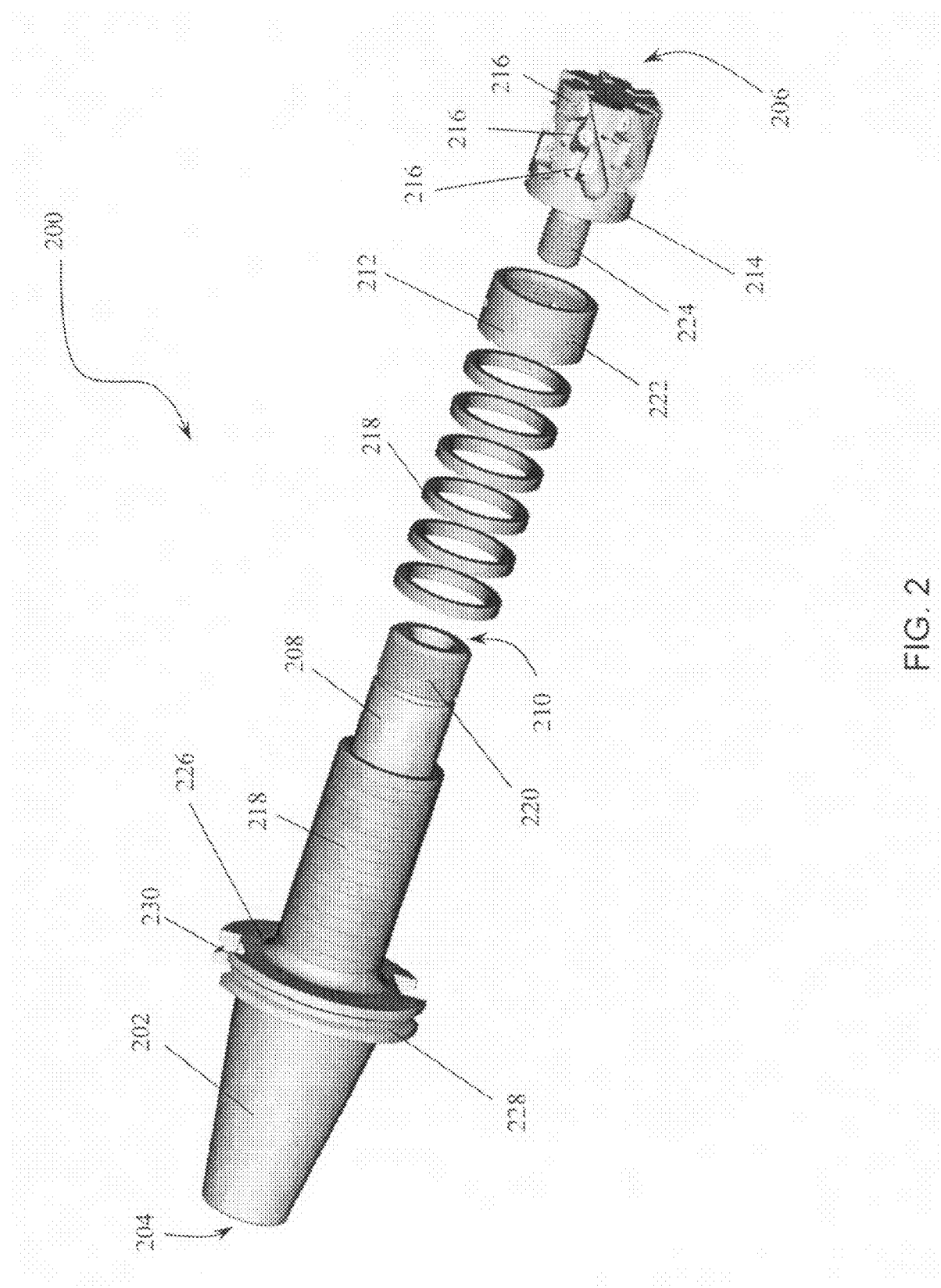
FIG. 2 shows a partially disassembled, schematic view of an exemplary embodiment of a material removal tool with spacers.

FIG. 2 shows a partially disassembled, schematic view of an exemplary embodiment of a material removal tool with spacers The material removal tool 200 has a housing 202 at a mating end 204 and has a material removal end 206. An extension 208 longitudinally extends from the housing 202 to a distal end 210. A nut 212 is at the distal end 210 of the extension 208 and a cap 214 is mounted to the distal end 212 of the extension 208. The cap 214 includes a plurality of cutting inserts 216.

Arranged along at least a portion of the length of the extension 208 is a plurality of spacers 218. The spacers 218 are formed from a material having a Young's modulus of about 1.5×, alternatively about twice, that of steel, i.e., about $40 \times 10^6$ lbf/in$^2$, about $45 \times 10^6$ lbf/in$^2$, about $50 \times 10^6$ lbf/in$^2$, about $60 \times 10^6$ lbf/in$^2$ or more. In one exemplary embodiment, the spacers 218 are formed from cemented carbide. The spacers 218 can take any physical form that, when positioned on the material removal tool, places the stiffer material of the spacer at a location of greatest resistance to bending moments (i.e. highest section modulus) of the material removal tool. One exemplary embodiment of the physical form is the shape of a washer. In an additional exemplary embodiment, the spacer is a washer having an outer diameter surface and an inner diameter surface and the radius of the outer diameter surface ranges from about 1.33 to about 2 times the radius of the inner diameter surface.

The number of spacers along the extension varies based on the length of the material removal tool. As shown in the assembled view of FIG. 3, the material removal tool 300 has projection length L, which is from the gage line 302 to the cutting end 304, and has a diameter D. The gage line is the maximum diameter of the mating end that contacts the machine tool when in operation. In exemplary embodiments, a ratio of the projection length to the diameter is about 2:1 to about 18:1. Standard lengths are about 2:1, about 3:1, about 4:1, about 5:1, about 6:1, about 7:1, about 8:1 and about 12:1. However, any projection length and diameter can be used in that performance is improved using the disclosed spacers. As the length of the extension varies between material removal tools, the number of the spacers arranged along the extension varies.

Figure 1:
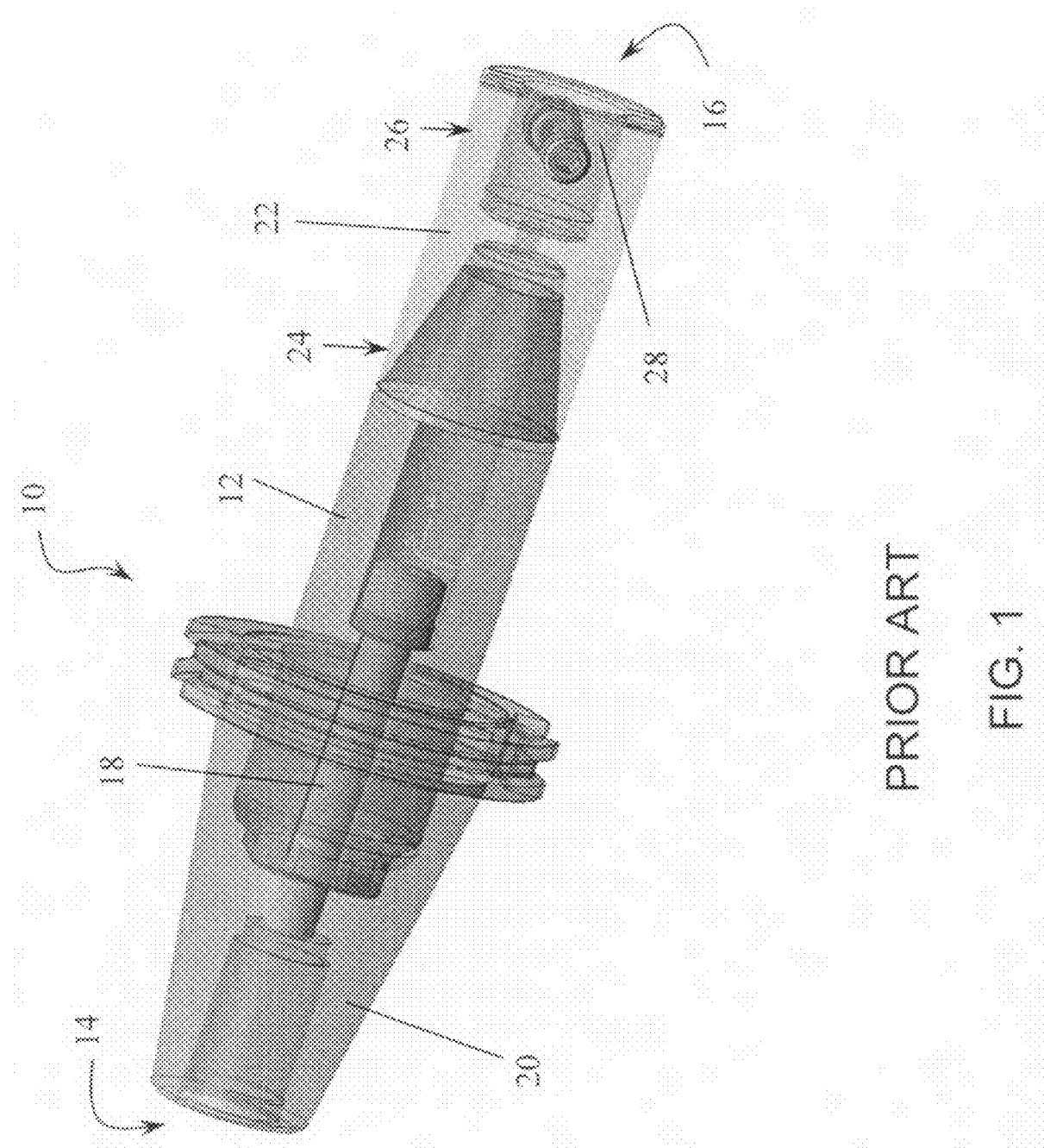
FIG. 1 shows a prior art tool with a unitary cemented carbide shank.

The extension is an internal piece made of steel or other high strength material. The extension can be attached to the housing by any suitable means. For example, and as seen in FIG. 1, the extension can be bolted into the housing. Alternatively and as shown, for example, in FIG. 2, the extension can be integrally formed with the housing, e.g., cast, forged or machined.

The nut 212 of the material removal tool 200 is attached to the extension 108 by, for example, a threaded connection 220. If a threaded connector is used, any type of threaded connector can be used. However, it is preferred that the threaded connector be grounded threads. Forged or cut threads can also be used, but these types of threads can lose preload by friction. An adapter 222, such as a recess or a hole, can be included on the nut for attachment of a tightening tool, such as a spanner wrench. An alternative method by which to attach the nut to the extension and by which to establish a preload on the system, is to attach the nut by a shrink fit technique. Here, attaching the nut to a heated and expanded extension would establish preload upon cooling as the extension returns towards its original length.

When attached to the extension 208, the nut 212 places an optional compressive preload on the plurality of spacers 218. An example of a suitable compressive preload is about 75% of a proof load of the threaded connection. Another example of a suitable compressive preload for a steel thread is achieved by attaching the nut 212 to the extension 208 with the thread of M394, 7H with a torque of about 200 to about 250 ft-lbs, alternatively about 225 ft-lbs. The compressive preload contributes to mitigating any tension loads that occur during operation of the material removal tool. As the spacers 218 are placed into compressive preload, the extension 208 is placed into tensile preload.

The cap 214 mounted to the distal end 210 of the extension 208 includes a plurality of cutting inserts 216. Each cutting insert 216 is mounted to a seating surface in a pocket formed in the cap 214. Suitable cutting inserts can be of any type, e.g., milling, turning, boring. One exemplary embodiment of suitable cutting inserts is the side locking insert disclosed in U.S. application Ser. No. 11/409,089, now U.S. Pat. No. 7,607,868, entitled "Side Locking Insert and Material Removal Tool with Same," filed Apr. 24, 2006, the entire contents of which are incorporated herein by reference.

When both a nut 212 and a cap 214 are present in the material removal tool 200, the nut 212 is positioned around the circumference of the extension 208 at the distal end 210 and the cap 214 is mounted to a cross-section of the distal end 210 of the extension 208. For example and as shown in FIG. 2, a threaded portion 224 of the cap 214 can be threaded into threads made in the cross-section of the distal end 210 of the extension 208.

When attached to the extension 208, the cap 214 can optionally provide a compressive preload on the plurality of spacers 218. An example of a suitable compressive preload resulting from the cap threaded into the extension is achieved by attaching the cap 214 to the extension 208 with a thread size of M20-2.5, 7H to a torque of about 150 to about 250 ft-lbs, alternatively about 200 ft-lbs. When the cap 214 provides a compressive preload on the plurality of spacers 218, the cap 214 also provides a tensile preload to the extension 208. When the nut 212 and the cap 214 are used together, the nut 212 provides a first compressive preload and the cap 214 provides a second compressive preload (and similarly for the respective tensile preloads). Alternatively, the first compressive preload can be considered a primary preload when it is larger than the second compressive preload, and vice versa. Alternatively, the cap is assembled at a lower compressive preload that that of the nut to allow preferential removal of the cap without affecting or with minimal affect on the nut. A preload cap also ensures adequate and continued preload on the spacers in the case of premature loosening of other preload applicators, such as the nut, which can occur during use.

The housing 202 at the mating end 204 of the material removal tool 200 attaches to a machine tool, such as a HAAS VF6 milling machine, during operation. The housing can take any suitable form that allows attachment to a desired machine tool. In an exemplary embodiment, the housing has a tapered surface, for example, tapered rearward or toward the mating end 204. A transition piece 226 can optionally be included at one end of the housing 202. An example of a transition piece 226 includes at least one feature for mating to an operating machine or to a storage system. For example, the transition piece 226 can include a circumferential groove 228. The circumferential groove 228, or similar structure, can provide an attachment point for mating the material removal tool 200 to a carousel storage system used in machining operations to store multiple material removal tools. In another example, the transition piece 226 can include a key slot 230. The key slot 230, or similar structure, can provide an orientation or a mating with a corresponding feature on the machine tool when the material removal tool is mounted for use.

Use of separate components in the material removal tool has several advantages. For example, the presently disclosed cap allows for component replacement of the cap without discarding the whole assembly of the material removal tool. A similar advantage is achieved by having the nut, spacers, and, if applicable, the extension and the housing, being separately replaceable.

Figure 3:
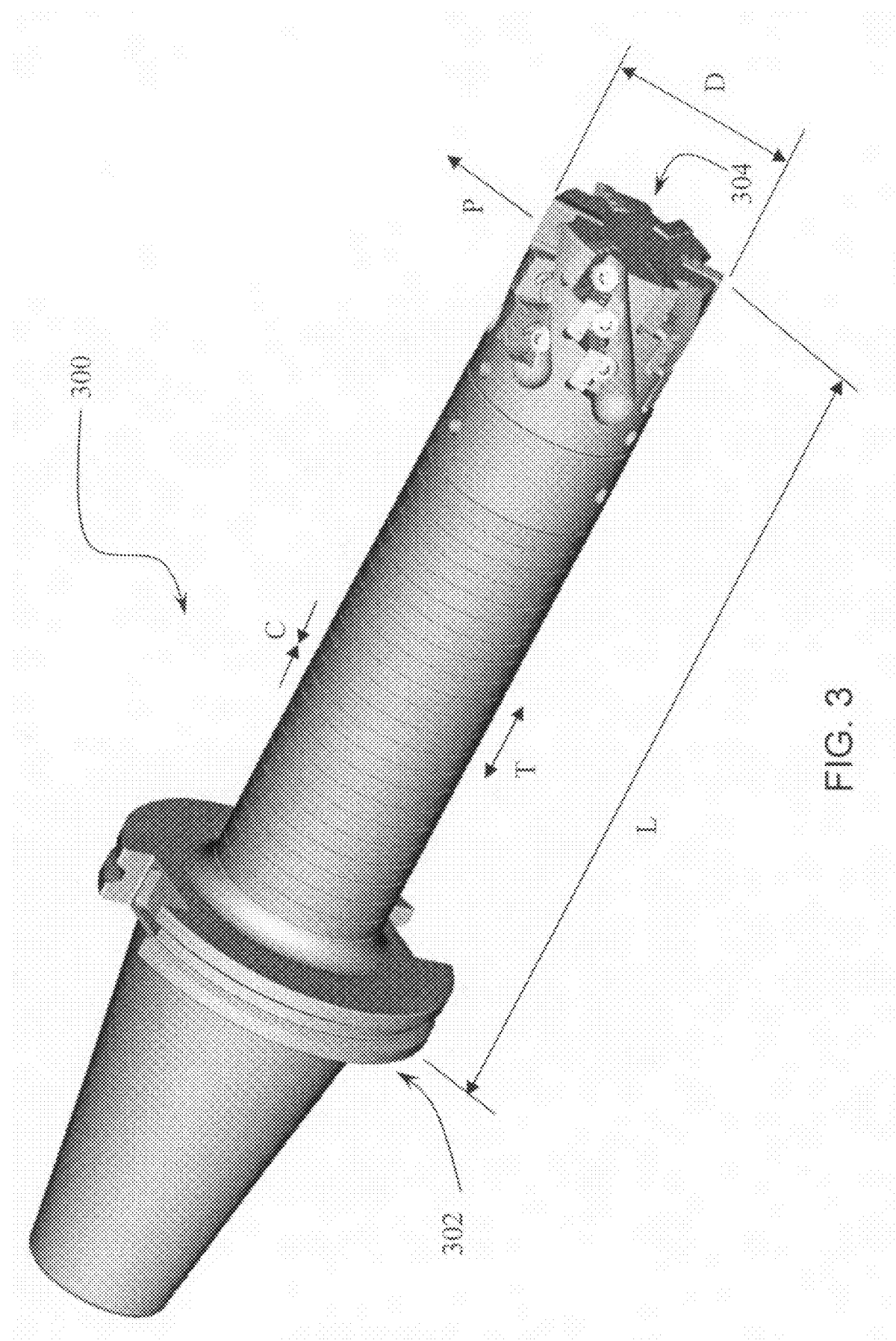
FIG. 3 shows an assembled, schematic view of an exemplary embodiment of a material removal tool with spacers.

FIG. 3 shows an assembled, schematic view of an exemplary embodiment of a material removal tool with spacers. In use, the material removal tool 300 sees a push back force at the cutting end 304 that deflects the cutting end 304 in direction P. This places one side of the material removal tool in compression C and the other side of the material removal tool in tension T. However, the preload in compression acts to mitigate the realized tension on that side of the material removal tool. In addition, because adjacent spacers are not restricted in their movement, the spacers can gap, slide or otherwise move apart under the tension. This is analogous to a form of predetermined relief points in tension and contributes to reduced failure of the material removal tool.

FIGS. 4A and 4B relate to deformation observed when using a material removal tool with spacers. FIG. 4A shows a schematic representation of a material removal tool with cemented carbide spacers. This material removal tool is substantial as shown and described with respect to FIGS. 2 and 3. FIG. 4A also shows the material removal tool 400 with an applied force (F) that simplistically represents the push back force. The applied force (F) is applied at the cutting end of the tool and produces a lateral deflection. The angular deformation α and the bending moment 402 are both shown in FIG. 4A. The tested material removal tool 400 had a ratio of 5:1. It was assumed that the mounting 404 was rigid and the lateral deflection was measured using a Kistler 9255A Force Dynamometer. FIG. 4B is a graph of the applied force as a function of deformation in two directions for the material removal tool shown in FIG. 4A. The material removal tool was measured from two directions: the first parallel to the key slot (see FIGS. 2 and 3) and the second 90° to the key slot. As seen in FIG. 4B, the resulting performance of the material removal tool is substantially the same, i.e., with the instrument error, for both the parallel and the 90° directions.

Figure 5B:
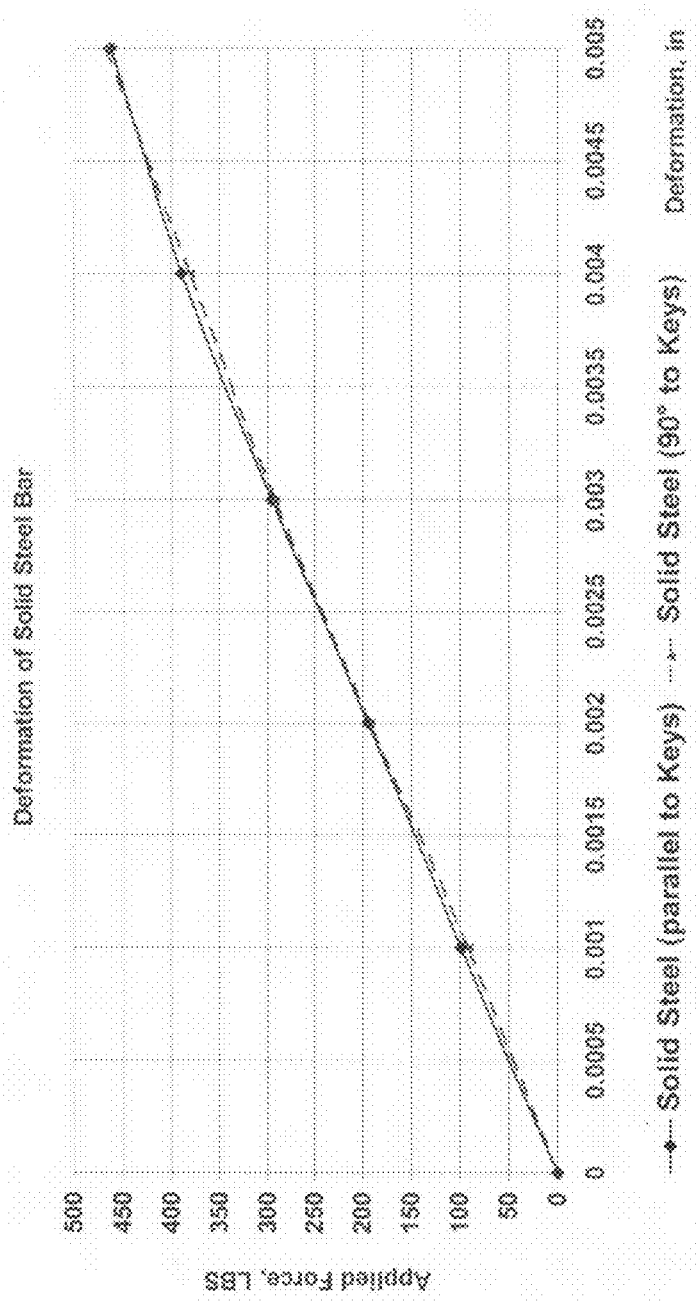
FIG. 5B is a graph of applied force as a function of deformation in two directions for the material removal tool shown in FIG. 5A.
Figure 5A:
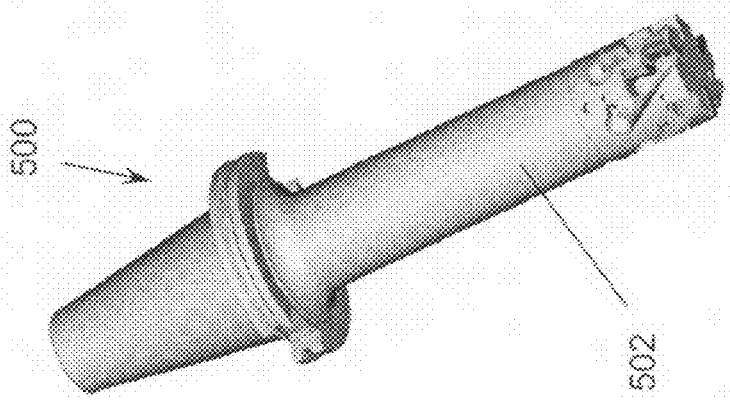
FIG. 5A shows a schematic representation of a material removal tool with solid steel for the projection length.

FIGS. 5A and 5B relate to deformation observed when using a material removal tool formed of solid steel. FIG. 5A shows a schematic representation of a material removal tool 500 with a solid steel shank. FIG. 5B is a graph of the applied force as a function of deformation in two directions for the material removal tool shown in FIG. 5A. The material removal tool 500 was tested under the same conditions as those for material removal tool 400 in FIG. 4A, and the same testing regime was used. As seen in FIG. 5B, the resulting performance of the material removal tool are substantially the same, i.e., with the instrument error, for both the parallel and the 90° directions.

Comparing the results from FIG. 4B to that of FIG. 5B, it is seen that the material removal tool with spacers (FIG. 4A) requires more force to achieve the same amount of deflection—500 lbs for a 0.003 inch deformation for the material removal tool with spacers whereas only 300 lbs of force is needed for the same deflection in the material removal tool with a solid steel shank (FIG. 5A). In other words, the material removal tool with spacers is approximately about one-and-a-half times to about twice as stiff as the material removal tool with solid steel. It can be concluded that the material removal tool with spacers will be more stiff than the material removal tool with solid steel by approximately the difference in the Young's modulus between the material of the spacers and that of steel. If different materials are used for different spacers on the same material removal tool, then prediction/comparison of the stiffness of the material removal tool as compared to a steel material removal tool can be made using Euler-Bernoulli equations for bending beams and considering the length varying value for the Young's modulus arising from the value of the Young's modulus of the individual spacers and the distance relationship from the gage line.

Figure 6:
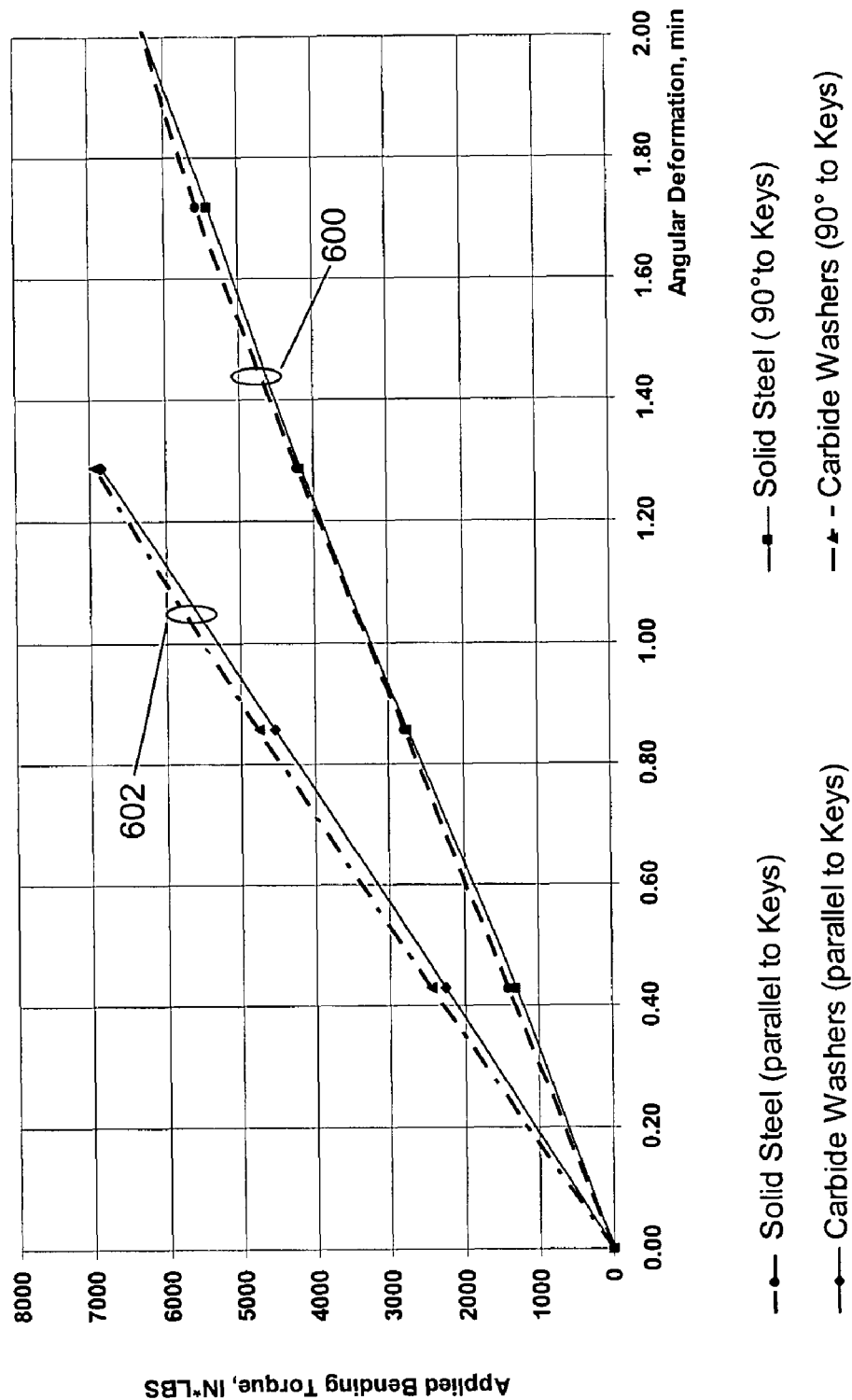
FIG. 6 is a graph of applied bending torque as a function of angular deformation in two directions for a material removal tool with a solid steel extension and for an exemplary embodiment of a material removal tool with cemented carbide spacers.

FIG. 6 is a graph of applied bending torque as a function of angular deformation in two directions for a material removal tool with a solid steel shank (legend "solid steel" and curves labeled 600) and for an exemplary embodiment of a material removal tool with cemented carbide spacers (legend "carbide washers" and curves labeled 602). The measurements were taken parallel to and 90° to the key slot as described for FIGS. 4B and 5B. Here, the material removal tool with cemented carbide spacers exhibited lower deformation at higher applied bending torque, indicative of a stiffer tool. For the same deformation, the material removal tool with cemented carbide spacers required approximately one-and-a-half times the applied bending torque and is consistent with the difference in material properties between the solid steel shank and the cemented carbide washer stiffened tool.

Related to FIG. 6, the static rigidity of an exemplary embodiment of a material removal tool with cemented carbide spacers was compared to that of a material removal tool with a solid steel shank. Static rigidity was defined as the amount of bending moment (measured in in*lbs) necessary to create 1 minute of the adapter angular deformation. The results are summarized in Table 1:

TABLE 1

Static Rigidity

| material removal tool with solid steel | material removal tool with cemented carbide spacers | Factor |
|---|---|---|
| 3213 in * lbs/min | 5528 in * lbs/min | 1.7 |

Figure 7:
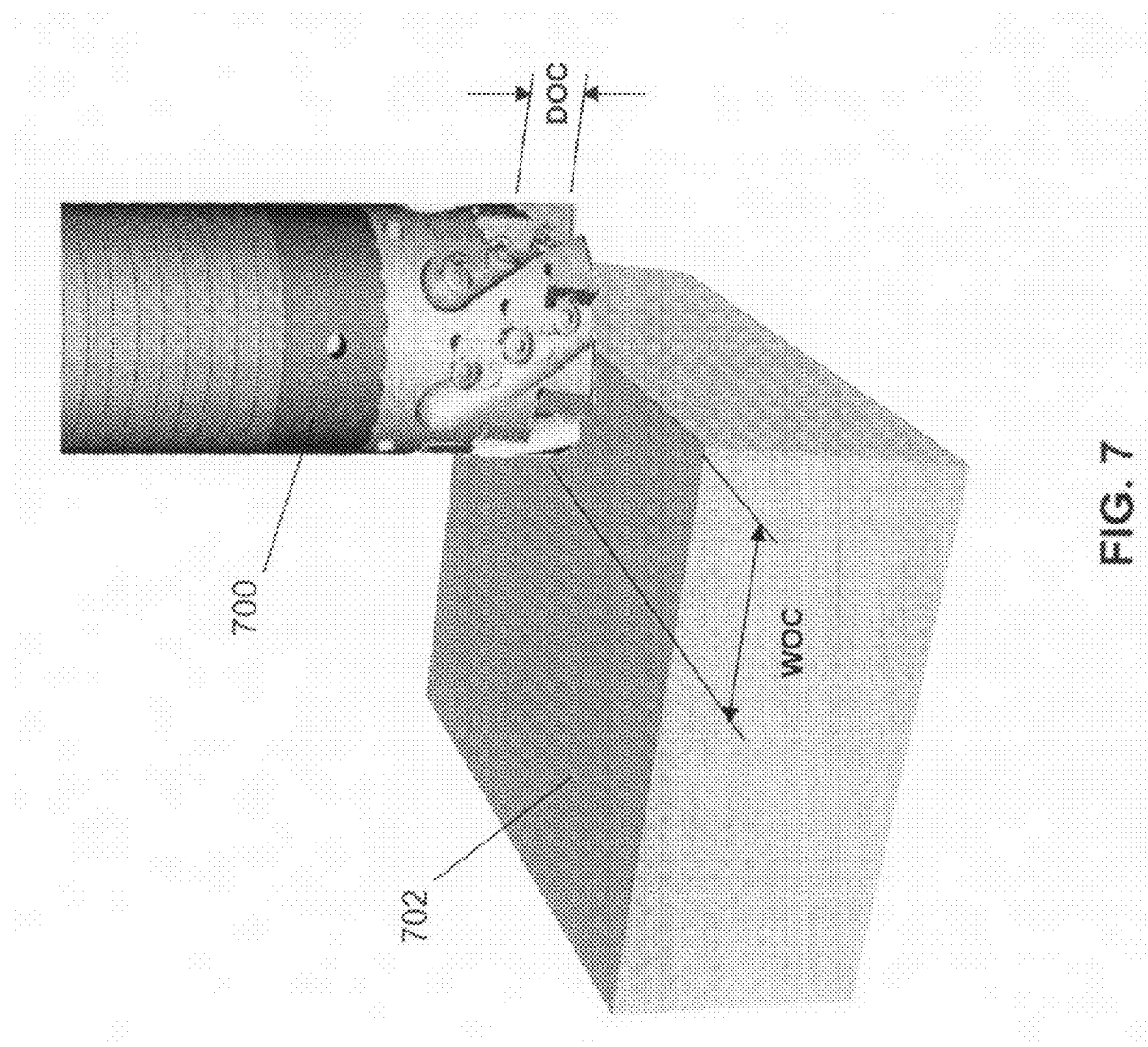
FIG. 7 illustrates an exemplary embodiment of a material removal tool with cemented carbide spacers operating to remove material from a workpiece.

FIG. 7 illustrates an exemplary embodiment of a material removal tool with spacers 700 operating to remove material from a workpiece 702. During each pass of the material removal tool with spacers 700, material is removed to a depth-of-cut (DOC) and a width-of-cut (WOC). Depth-of-cut was determined to be the maximum depth of material at that width that could be removed by a single pass of the material removal tool without observing "chatter"—the vibrations leading to deflection of the tool and typically producing a frequency correlated to the cutting insert(s) jumping off the workpiece and then returning to contact and continued machining. Comparison milling cuts were conducted using a vertical milling machine HAAS VF6 (30 HP). Milling parameters were:

Width-of-cut: 1.0 inches
Speed-of-cut: 400 sfm
Feed rate: 0.10 inches per tooth (ipt)
Results from this test are presented in Table 2.

TABLE 2

Milling Cut Comparison Test

| Parameter | material removal tool with solid steel | material removal tool with cemented carbide spacers |
|---|---|---|
| max. DOC | 0.040 inches | 0.080 inches |

The material removal tool with cemented carbide spacers demonstrated a two times larger depth of cut in a vibration free environment or substantially vibration free environment. The Milling Cut Comparison Test indicates that the material removal tool with the preloaded spacers provide a higher performance capacity for material removal tools with ratios (length to diameter) of 4:1 to 8:1 and suggests that material removal tools with higher ratios will demonstrate consistent results, e.g., substantially improved performance.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A material removal tool, comprising:
a housing in the form of a taper shank at a mating end for mating with a spindle of a machine tool;
an extension extending along a central longitudinal axis of the material removal tool from the housing to a distal end of the extension that is distal relative to the mating end;
a plurality of spacers arranged along the extension;
a nut at the distal end of the extension for applying a preload to the spacers and
a cap including an arrangement for cutting a workpiece and mounted to the distal end of the extension at an end of the nut distal relative to the mating end,
wherein the plurality of spacers are formed from a material having a Young's modulus of greater than about 1.5 times that of steel.

2. The material removal tool according to claim 1, wherein at least a portion of the plurality of spacers are formed from cemented carbide.

3. The material removal tool according to claim 1, wherein the nut places a compressive preload on the plurality of spacers.

4. The material removal tool according to claim 3, wherein the nut is threaded onto the distal end of the extension.

5. The material removal tool according to claim 4, wherein the compressive preload is about 75% of a proof load of the threaded nut.

6. The material removal tool according to claim 3, wherein the nut places a tensile preload on the extension.

7. The material removal tool according to claim 1, wherein the cutting arrangement includes a plurality of cutting inserts.

8. The material removal tool according to claim 7, wherein the cutting inserts are side locking inserts.

9. The material removal tool according to claim 1, wherein the cap places a compressive preload on the plurality of spacers.

10. The material removal tool according to claim 1, wherein the extension is integrally formed with the housing.

11. The material removal tool according to claim 1, wherein the spacers are washers.

12. The material removal tool according to claim 11, wherein the washers have an outer diameter and an inner diameter and the outer diameter ranges from about 1.33 to about 2 times the inner diameter.

13. The material removal tool according to claim 1, wherein the nut is positioned around the circumference of the extension at the distal end of the extension and the cap is mounted to a cross-section of the distal end of the extension, and wherein the cutting arrangement of the cap includes a plurality of cutting inserts.

14. The material removal tool according to claim 13, wherein the nut places a first compressive preload on the plurality of spacers and the cap places a second compressive preload on the plurality of spacers.

15. The material removal tool according to claim 1, wherein the material of the plurality of spacers has a Young's modulus of about 1.5 times to about 2.5 times that of steel.

16. The material removal tool according to claim 1, wherein the material of the plurality of spacers has a Young's modulus in the range of about $45 \times 10^6$ lbf/in$^2$ to about $60 \times 10^6$ lbf/in$^2$.

17. The material removal tool according to claim 1, wherein the material removal tool has a ratio of a projection length to a diameter of about 2:1 to about 12:1.

18. The material removal tool according to claim 17, wherein the ratio is about 3:1 to about 6:1.

19. The material removal tool according to claim 17, wherein the projection length and a number of the plurality of spacers arranged along the extension vary between material removal tools having different projection lengths.

20. The material removal tool according to claim 1, wherein the material of the plurality of spacers has a Young's modulus of greater than about 2 times that of steel.

21. The material removal tool according to claim 1, wherein the material of the plurality of spacers has a Young's modulus of greater than about $60 \times 10^6$ lbf/in$^2$.

22. A method of manufacturing a material removal tool, comprising:
  providing a housing in the form of a taper shank at a mating end for matings with a spindle of a machine tool;
  arranging a plurality of spacers along at least a portion of an extension, the extension extending along a central longitudinal axis of the material removal tool from the housing of the material removal tool to a distal end of the extension that is distal relative to the mating end;
  fastening a nut at the distal end of the extension;
  preloading the plurality of spacers into compression with the nut; and
  providing a cap including an arrangement for cutting a workpiece and mounted to the distal end of the extension at an end of the nut distal relative to the mating end,
  wherein the plurality of spacers are formed from a material having a Young's modulus of greater than about 1.5 times that of steel.

23. The method according to claim 22, wherein at least a portion of the plurality of spacers are formed from cemented carbide.

24. The method according to claim 22, wherein preloading the plurality of spacers into compression includes providing at least a first compressive preload from fastening the nut.

25. The method according to claim 24, wherein the cutting arrangement of the cap includes a plurality of cutting inserts, and wherein preloading the plurality of spacers into compression includes providing a second compressive preload on the plurality of spacers from mounting the cap.

26. The method according to claim 22, wherein the material removal tool has a ratio of a projection length to a diameter of about 2:1 to about 12:1, and wherein the projection length and a number of the plurality of spacers arranged along the extension vary between material removal tools having different projection lengths.

27. The method according to claim 22, wherein the material of the plurality of spacers has a Young's modulus of about 1.5 times to about 2.5 times that of steel.

28. The method according to claim 22, wherein the material of the plurality of spacers has a Young's modulus in the range of about $45 \times 10^6$ lbf/in$^2$ to about $60 \times 10^6$ lbf/in$^2$.

29. The material removal tool according to claim 22, wherein the material of the plurality of spacers has a Young's modulus of greater than about 2 times that of steel.

30. The material removal tool according to claim 22, wherein the material of the plurality of spacers has a Young's modulus of greater than about $60 \times 10^6$ lbf/in$^2$.

31. A method of machining a workpiece, the method comprising:
  removing material from the workpiece with a material removal tool,
  wherein the material removal tool includes a housing in the form of a taper shank at a mating end for mating with a spindle of a machine tool, an extension extending along a central longitudinal axis of the material removal tool from the housing to a distal end of the extension that is distal relative to the mating end, a plurality of spacers arranged along the extension, and a nut at the distal end of the extension for applying a preload to the spacers, a cap including an arrangement for cutting the workpiece and mounted to the distal end of the extension at an end of the nut distal relative to the mating end, and
  wherein the plurality of spacers are formed from a material having a Young's modulus of greater than about 1.5 times that of steel.

32. The method according to claim 31, wherein at least a portion of the plurality of spacers are formed from cemented carbide.

33. The method according to claim 31, wherein the nut places a compressive preload on the plurality of spacers.

34. The method according to claim 31, wherein the workpiece is formed from a titanium-based alloy.

35. The method according to claim 31, wherein removing material from the workpiece with the material removal tool forms a structural component of an aerospace vehicle.

36. The method according to claim 31, wherein the material of the plurality of spacers has a Young's modulus of about 1.5 times to about 2.5 times that of steel.

37. The method according to claim 31, wherein the material of the plurality of spacers has a Young's modulus in the range of about $45 \times 10^6$ lbf/in$^2$ to about $60 \times 10^6$ lbf/in$^2$.

38. The material removal tool according to claim 31, wherein the material of the plurality of spacers has a Young's modulus of greater than about 2 times that of steel.

39. The material removal tool according to claim 31, wherein the material of the plurality of spacers has a Young's modulus of greater than about $60 \times 10^6$ lbf/in$^2$.

* * * * *